United States Patent [19]

Burgess et al.

[11] 4,184,755
[45] Jan. 22, 1980

[54] IMAGE PROJECTION SYSTEMS

[76] Inventors: David E. Burgess, 2625 W. 182nd St., Torrance, Calif. 90504; Darrell J. Masters, 15636 S. Yukon Ave., Lawndale, Calif. 90260

[21] Appl. No.: 841,018

[22] Filed: Oct. 11, 1977

Related U.S. Application Data

[63] Continuation-in-part of Ser. No. 668,594, Mar. 19, 1976, abandoned.

[51] Int. Cl.² .............................................. G03B 21/56
[52] U.S. Cl. ....................................... 353/45; 350/117
[58] Field of Search ................... 353/45, 44; 350/117, 350/129; 362/127, 145; 428/513, 416

[56] References Cited

U.S. PATENT DOCUMENTS

| | | | |
|---|---|---|---|
| 2,004,200 | 6/1935 | Goodlin et al. | 362/429 |
| 3,269,259 | 8/1966 | Russell | 353/45 |
| 3,653,740 | 4/1972 | Ogura et al. | 350/117 |
| 3,795,567 | 3/1974 | Hoffman | 428/513 |
| 3,836,425 | 9/1974 | Whiting | 428/213 |
| 3,916,067 | 10/1975 | Jones et al. | 428/416 |

Primary Examiner—Steven L. Stephan
Attorney, Agent, or Firm—Romney, Schaap, Golant, Disner & Ashen

[57] ABSTRACT

An improvement for use in image projection systems of the type which project an image from a substrate where a projector causes the image to be displayed on a receiving member such as a projection screen remote from the projector. One important facet of the improvement resides in the receiving member, i.e., the projection screen. These systems are typically used for displaying scores in bowling games from a projector at the player end to a screen or receiving member at the scoring end. Projectors of this type normally comprise a projector base with a mirror system and a socket which has a light source therein located in relation to the mirror system. The improvement comprises a bracket which is replaceable for the original socket and light source therein. The bracket includes a plate having an improved light socket mounted on the plate. In addition, the bracket includes mounting means having apertures to receive conventional fasteners. These apertures are located in a positional relationship with apertures which received conventional fasteners for mounting the original socket. The improvement light source is capable of being inserted into the improvement socket and contains a filament which is located in relationship to the mirror in a manner similar to the relationship of the filament in the original light source. In addition, the improvement light source does not necessitate the use of an opaque portion which was employed in the original light source, but may utilize a light shield in order to mask direct light. An improved receiving member, e.g. the projection screen, is also utilized in place of the original receiving member. The improved receiving member is uniquely constructed so that it recaptures the projected image with a clarity and brightness which is not otherwise obtainable without the use of expensive beaded screens and the like. The improved light source generates light based on a power output of less than one-half of the power input of the original light source, but enables projection of the image to the improved receiving member with substantially the same degree of brightness.

13 Claims, 17 Drawing Figures

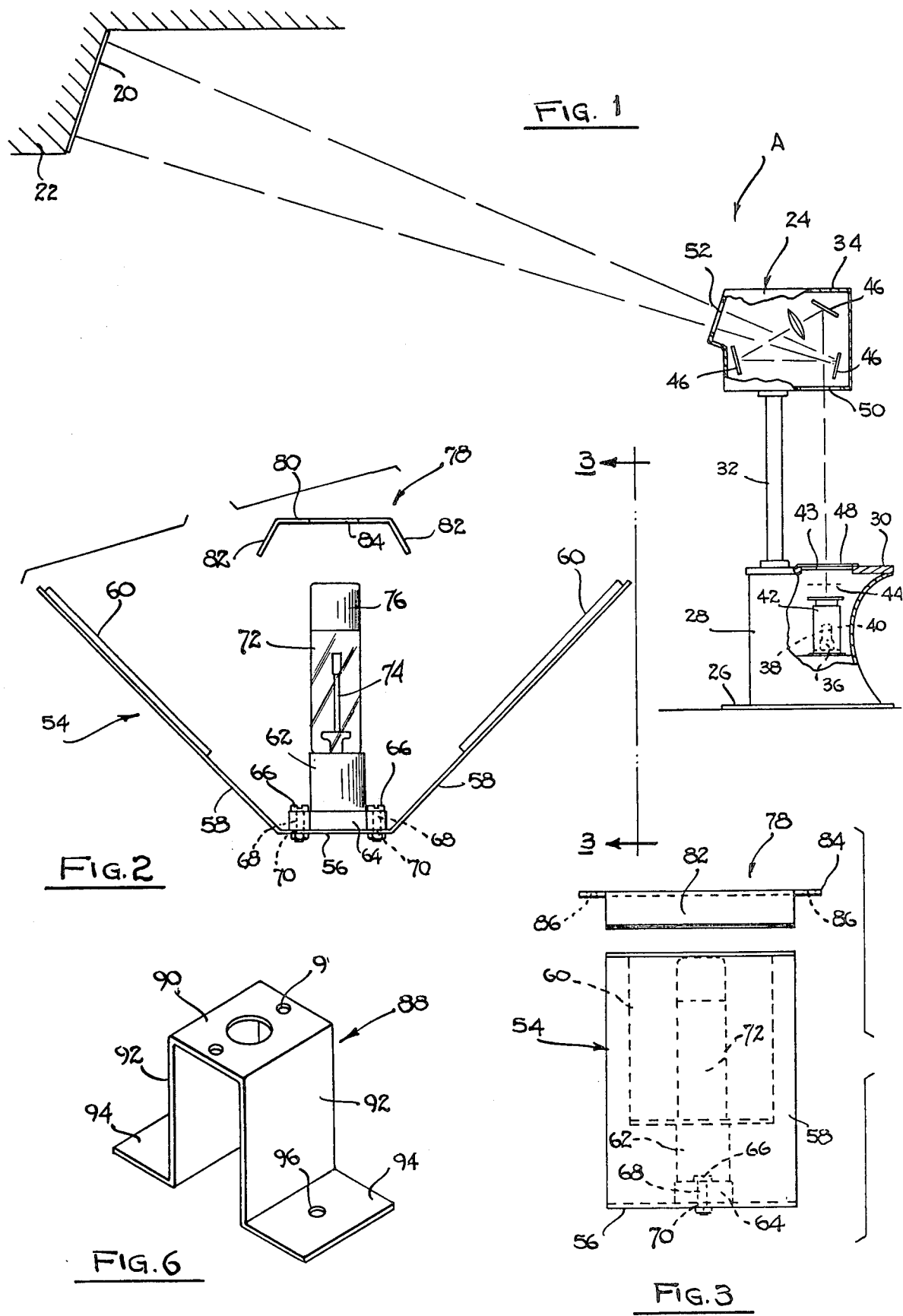

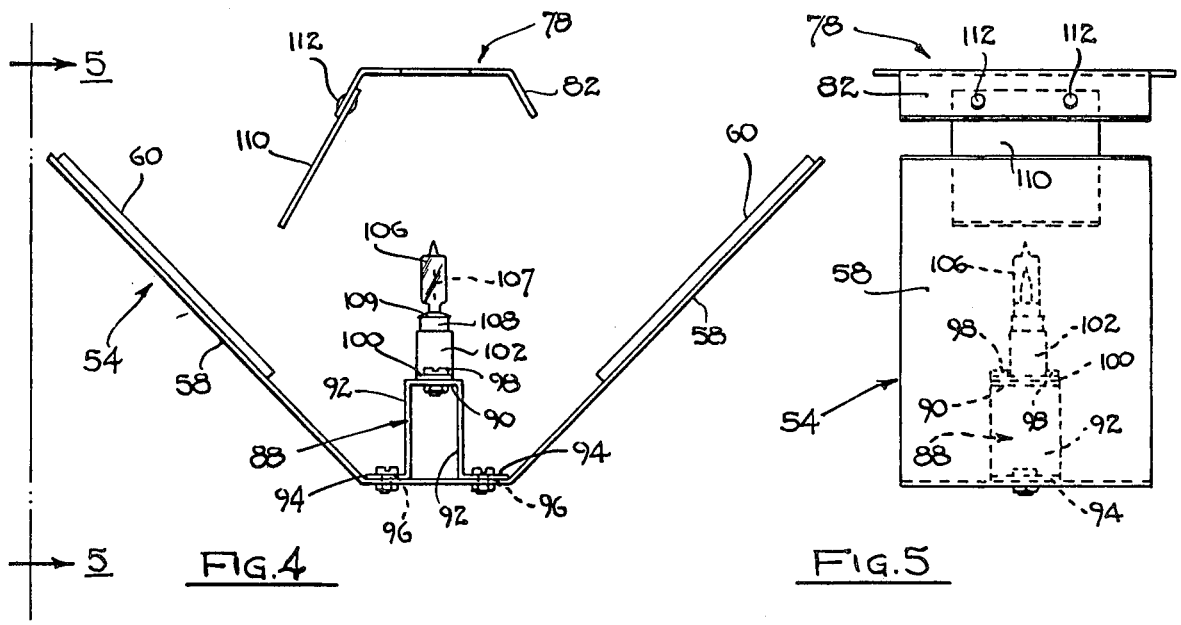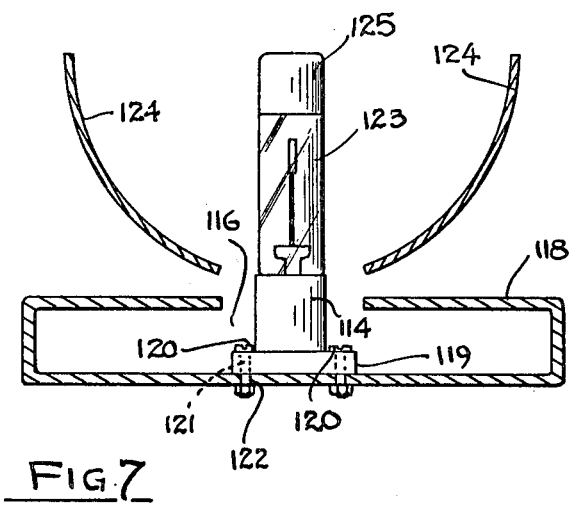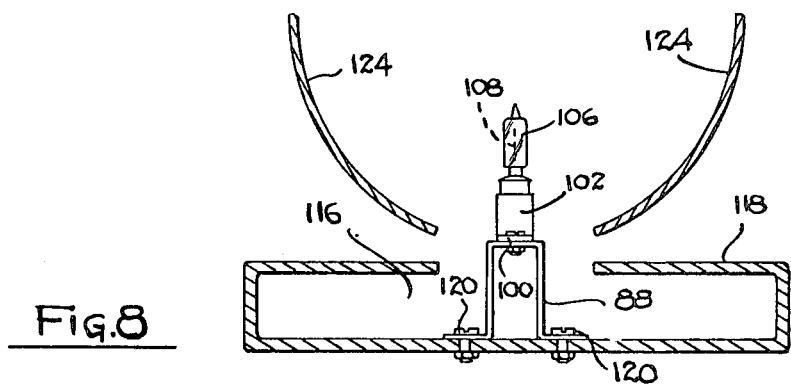

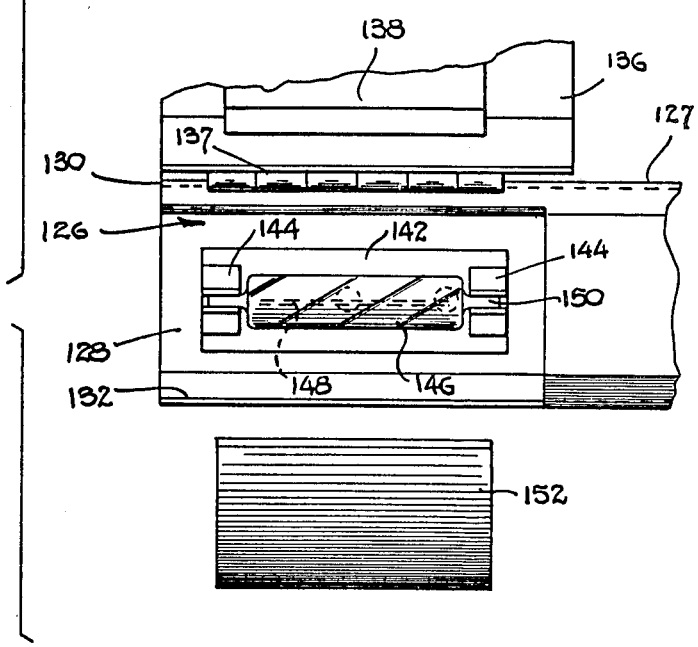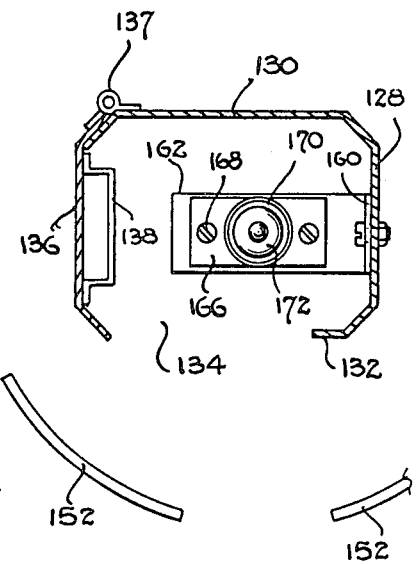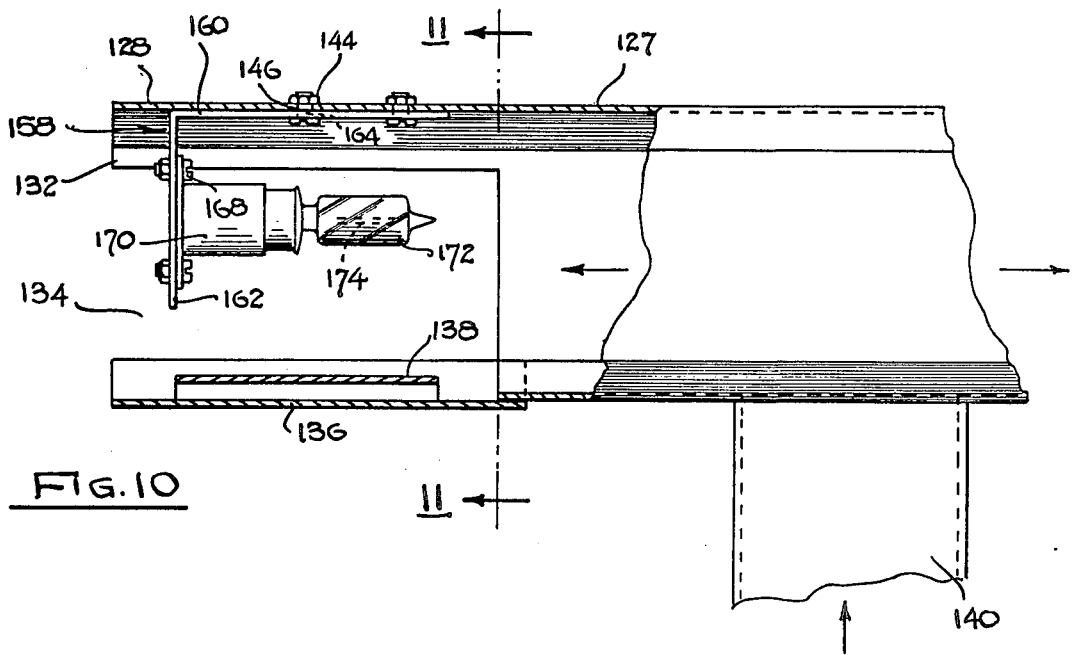

IMAGE PROJECTION SYSTEMS

RELATED APPLICATION

This application is a continuation-in-part patent application of Application Ser. No. 668,594, filed Mar. 19, 1976, for "IMAGE PROJECTION SYSTEMS" now abandoned.

BACKGROUND OF THE INVENTION

This invention relates in general to certain new and useful improvements in image projection systems, and, more particularly, to image projection systems which enable the use of an improved projection screen which enables reproduction of a projected image from a light source producing the same degree of brightness with substantially less power output.

Image projection systems, including those which are often referred to as score projection systems, have been widely used in modern equipment in the sport of bowling. These score projectors are generally located at a player end of the bowling alley and are designed to project the players' scores as written on a score sheet to a receiving area located above the scoring end or bowling pin end of a bowling alley. Such score projectors are commercially available and are offered in various models by AMF, Incorporated, of Westbury, New York, and from the Brunswick Corporation of Chicago, Ill., under the trademark "Tel-E-Score".

Generally, the receiving surface adopted the form of a flat wall, such as a plaster or dry wall, which was painted with a coating in order to render the reproduction of the projected image. In some cases, depending upon the construction, the coating may be painted upon a flat board which over-hangs a wall section and which is located at an appropriate angle in order to reflect the projected image. In other cases, the users of these image projection systems have utilized beaded or lectilinear cloth-baked foil screens supported on wooden or metal frames in place of a painted wall section. While these prior art screens have reflective capabilities in the general order of the improved screens of the present invention, as hereinafter described, they can only be manufactured at substantially higher cost than the improved screens of the invention. Moreover, these beaded type and lectilinear type screens suffer from many disadvantages in that they are not washable and are often quite delicate. The beaded screens, in particular, are those screens which are manufactured for projection of photographic images, as for example, from slide projectors, and therefore these screens are not very effective for use in the image projection systems of the present invention.

The image projector generally comprises a base member having the projection lamp with mirrors located in relationship to the projection lamp. The projection lamp generates a source of light and through surface mirrors and projection lenses in the projection head of the image projector, an image on a score sheet can be projected toward the receiving member. Due to the substantial distance between the receiving member and the score projector, and moreover due to the inefficiency of the mirror system and light source employed in such systems, a substantial amount of light must be generated. Generally, it has been found that approximately 750 watt projection lamps must be used.

Due to the substantial power input required to operate these score projection systems, high current carrying conductors must be utilized. In addition, these high power operating lamps generate a substantial amount of heat which must be dissipated. Consequently each of these units generally employ some form of blower or cooling fan which, in addition, consumes a substantial amount of power.

Due to the very substantial increase in the cost of energy, and particularly electrical energy, in recent times, the cost of operating these score projecting systems has become quite substantial. However, heretofore, there has been no effective means for operating these score projecting systems with-any effective means for reducing the cost of operation.

The present invention provides an improved projection screen which can be used in environments other than those of a scoreprojecting system and, in essence, can be used in any environment in which an image is projected from a projector through a negative or positive type pictorial substrate to project an image to an enlarged receiving screen. In each case, whether or not light sources of reduced power are used, the projected image on the improved receiving screen is considerably improved. In those cases. where improved power sources are employed, then the image reproduced on the projection screen will be very substantially improved and where the power sources are not improved, by mere change of the improved projection screen of the present invention, the reproduction is still greatly enhanced.

OBJECTS OF THE INVENTION

It is, therefore, the primary object of the present invention to provide an improvement in image projection systems which enables an image to be projected from an image projector to a receiving member with the same degree of clarity and brightness, but with a substantially lesser amount of power input for operation of the projector, thereby lending to substantial power savings.

It is another object of the present invention to provide an improvement in image projection systems of the type stated which includes an assembly for installation at an on-site location and which is capable of being adapted to a wide variety of commercially available image projection systems.

It is a further object of the present invention to provide an improvement in image projection systems of the type stated which utilizes improved light sources in the projectors and improved receiving members for the displaying of the projected image.

It is an additional object of the present invention to provide an improvement in image projection systems which can be made at a relatively low unit cost and installed at a low unit cost.

It is also an object of the present invention to provide an improvement in image projection systems of the type stated which is highly reliable in its operation and highly compatible with the remaining portions of the image projection system and which requires little or no maintenance.

It is another object of the present invention to provide a method of improving the transmission of images from a projector to a receiving member by altering the light source therein and operating the projector with a substantially less amount of electrical power.

It is another object of the present invention to provide an improved projection screen which can be used in a wide variety of applications and which eliminate conventional prior art screens requiring careful handling and constant cleaning.

With the above and other objects in view, our invention resides in the novel features of form, construction, arrangement and combinations of parts presently described and pointed out in the claims.

SUMMARY OF THE DISCLOSURE

The present invention relates in general to improvements for use in an image projection system of the type which projects an image from a substrate associated with a projector to a receiving member, as for example, a projector screen. While the improved image projection system is primarily described in terms of a score-projection system, the improved projector screen of the invention can be used in a wide variety of applications.

In a conventional score-projection system, the projector normally comprises a mirror and a socket with means on the socket having apertures sized to receive conventional fasteners. In this way, the socket may be physically attached to the projector housing. A light source is located in the socket, and this light source is normally provided with an opaque upper portion in order to reduce direct light transmission. In some cases, a heat controlling shield is located above the light source.

The improvement for these image projection systems resides in an improved receiving member which may be substituted for the original receiving member. The improved receiving member is formed of a retaining section with a highly reflective light image forming member on the retaining section. This preferred form of receiving member is light in weight and yet durable in construction and does not suffer substantial deleterious effects over a period of time. Moreover, this improved receiving member enables reproduction of an image with a light source of substantially reduced power consumption, but with at least the same clarity and brightness which was only obtained with very expensive beaded type screens. The improved screen of the present invention can nevertheless be constructed at a cost which is substantially less than that of these expensive beaded type screens.

The improvement, in the case of score projection systems, also comprises the removal of the original socket and the original light source which is replaced by a bracket having means for mounting the bracket to the projector in the region where the socket was located. In this case, the bracket includes mounting means having apertures located in the same position as the apertures in the mounting means of the original socket. In this way, the bracket may be secured to the projector with the same form of fasteners as was used to secure the socket. The bracket is designed to hold an improvement light socket and which is capable of receiving an improvement light source. The improvement socket is located so that the filament in the improvement light source is located in relationship to the mirror in a manner similar to the relationship of the filament in the original light source. In addition, the improvement light source does not have the opaque upper portion. Furthermore, a shield may be locatable in relationship to the improvement light source to mask direct light from the improvement light source.

By utilizing the improvement system herein provided, the improvement light source can generate the required light output based on a power input of less than one-half of the power input to the original light source. In most cases, it has been found that the improvement light source can generate the required light output based on 30% of the power input to the original light source, and, in many cases, based on 20% of the power input to the original light source. In addition, the image as projected to the improved receiving member is viewed with substantially the same degree of brightness as was present with the original light source.

The improved projection screen generally comprises a metal foil, such as an aluminum foil, with a dull surface thereof presented outwardly toward the projector. A first layer of a plastic material, as for example polyethylene, is disposed on one side of the aluminum foil and a second layer, as for example polyethylene, is disposed on the opposite side of the aluminum foil. This laminate of the pair of outer layers of plastic material and the inner metal foil is then bonded to a suitable substrate, such as a rigid board. In one embodiment, a cloth material such as nylon may be located on the outermost surface opposite the rigid board. In addition, a paperboard material or a paper material or a scrim material may also be employed and is interposed between the substrate and one of the polyethylene layers.

BRIEF DESCRIPTION OF THE DRAWINGS

Having thus described the invention in general terms, reference will now be made to the accompanying drawings in which:

FIG. 1 is a schematic side-elevational view, partially broken away and in section, and showing an image projection system utilizing an image projector and a reproducing screen;

FIG. 2 is a side-elevational view of a typical form of light source for use in an image projection system;

FIG. 3 is an end elevational view, substantially taken along the line 3—3 of FIG. 2;

FIG. 4 is a side-elevational view, somewhat similar to FIG. 2, and showing an improvement in the light source in the image projection system;

FIG. 5 is an end-elevational view, somewhat similar to FIG. 3, substantially taken along line 5—5 of FIG. 4, and also showing the improvement in the light source used in the image projection system;

FIG. 6 is a perspective view of a bracket used in the improvements in FIGS. 4 and 5.

Figure 12:
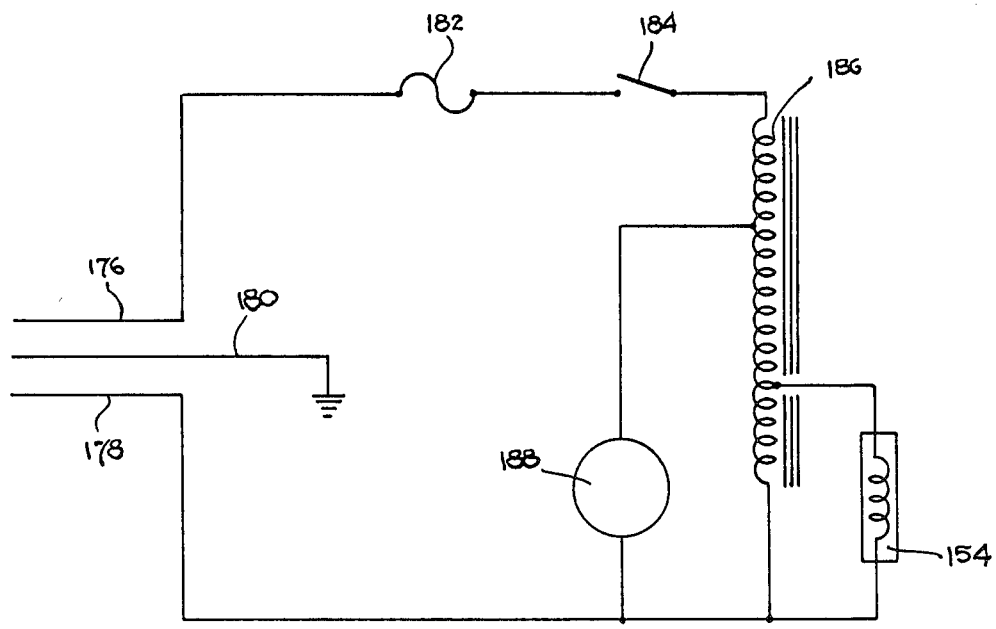
Figure 13:
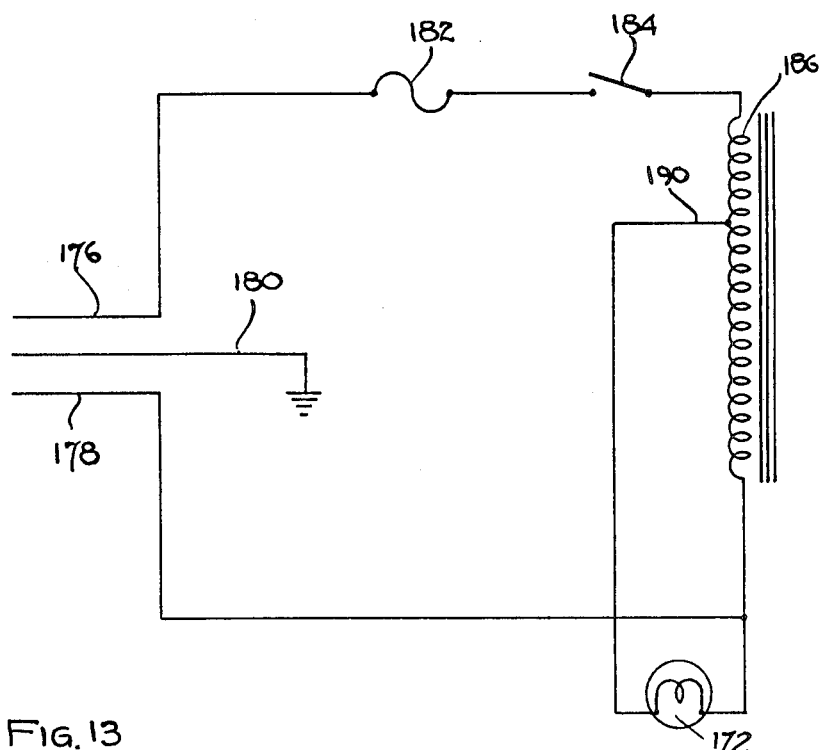
Figure 14:
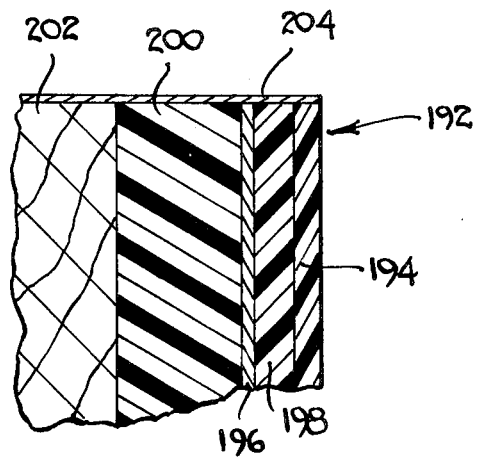
Figure 15:
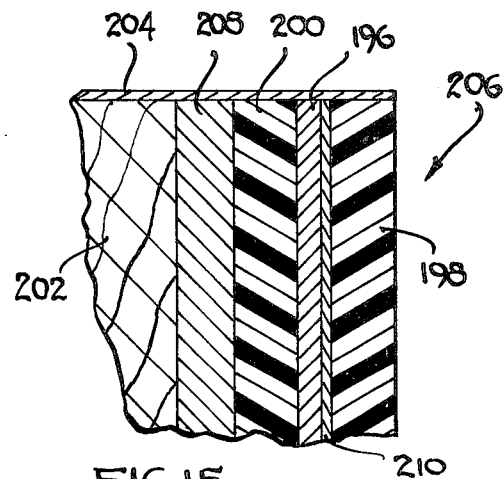
Figure 17:
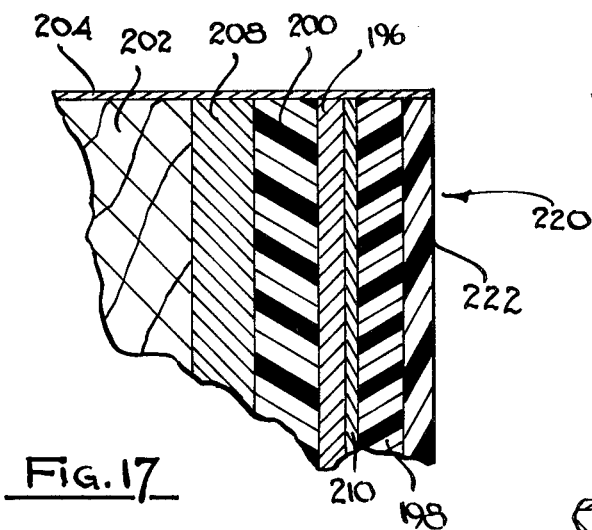
Figure 16:
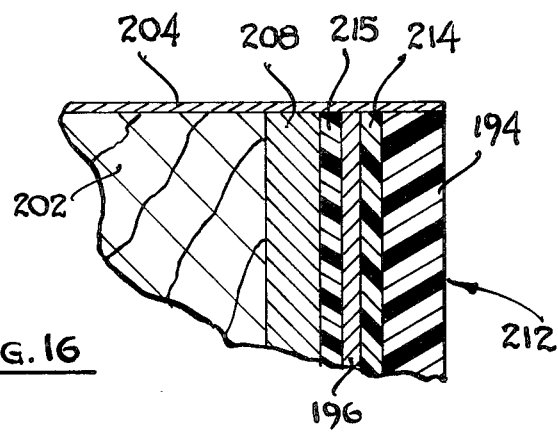

FIG. 7 is a vertical sectional view, and showing another form of light source used in image projection systems;

FIG. 8 is a vertical sectional view, somewhat similar to FIG. 7, and showing another form of improved light source for use in the image projection system;

FIG. 9 is a front elevational view, partially broken away, of another form of light source used in an image projection system;

FIG. 10 is a top plan view, partially in section, and showing an improvement light source for the image projection system of FIG. 9;

FIG. 11 is a vertical sectional view, taken along line 11—11 of FIG. 10, and also showing the improvement light source;

FIG. 12 is a schematic view of an electrical circuit operable with a light source in an image projection system;

FIG. 13 is a schematic view, somewhat similar to FIG. 12, and showing an improved wiring construction for the improved light source in the image projection system;

FIG. 14 is a vertical sectional view of an improved reproducing member which is used in an image projection of the present invention;

FIG. 15 is a vertical sectional view, similar to FIG. 14, and showing a modified form of improved reproducing member which may be used in an impage projection system of the present invention; and FIG. 16 is a vertical sectional view, somewhat similar to FIG. 14, of another improved reproducing member, and which may be used in an image projection system of the present invention; and FIG. 17 is a vertical sectional view, somewhat similar to FIG. 14, of yet a further improved reproducing member, and which may be used in an image projection system of the present invention.

DETAILED DESCRIPTION OF THE PREFERRED EMBODIMENT

Referring now in more detail and by reference characters to the drawings which illustrate preferred embodiments of the present invention, A designates an image projection system which utilizes an improved receiving member, e.g. an improved projection screen, in accordance with the present invention. In one embodiment, the improved receiving member is used in connection with a score projection system and which also contains several novel features.

The improved projection system in the form of an improved bowling alley score projection system includes a receiving member 20 located on a headboard 22 at the scoring end of a bowling alley. As indicated herein, the scoring end of the bowling alley is that end which is distal to the player end and contains the bowling pins.

Located in proximity to the player end of the bowling alley is an image projector 24 which generally includes a base plate 26 supporting an upstanding base housing 28 with a table plate 30 located on the upper portion of the base housing 28. An upstanding post 32, which extends from the base housing 28 and through the table plate 30, carries a projector head 34, often referred to as a "projector box".

The actual details of construction of these score projectors are well known in the prior art and are therefore neither illustrated nor described in significant detail herein. However, those components of the score projectors which are pertinent to to present invention are illustrated and described herein. In this same respect, it can be observed that the actual details of the various score projectors which are commercially available may vary, although the basic components thereof and the basic mode of operation is similar. Consequently, the improvement system of the present invention is applicable with substantially all such commercially available score projectors.

Generally, the base housing 28 will contain a lamp socket 36 which is suitably contained therein by means of any conventional support structure (not shown). A suitable light source, such as an electrically powered filament lamp, 38 is supportably mounted in the socket 36, the latter of which is conventionally connected to a source of electrical power in a manner as hereinafter described. The light source 38 contains a filament 40 which is located in relationship to a pair of angularly located mirrors 42 on opposite sides of the light source 38. Generally, these mirrors 42 may be flat, although not necessarily, and, in some cases, these mirrors 42 may adopt the shape of parabolic mirrors. A window assembly 43 is located in the surface of the table plate 30 for light reflected from the mirrors 42 to pass therethrough. Located immediately below the window assembly is a split condensing lens 44. Again, the mirrors 42 and the split condensing lens 44 are also retained by any suitable structure which is neither illustrated nor described in substantial detail herein.

The projection head 34 will generally include a plurality of mirrors designated as 46 which are capable of receiving light from the light source 38 through the window assembly 43 and projecting the light onto a substrate 48 located on the table plate 30. The image from the substrate 48 is redirected into the projection head 34 by means of reflected light through a window assembly 50 on the under surface of the projection head 34. This light is then projected from the mirrors 46 and through a projection window assembly 52 on the forwardly facing portion of the projection head 34 toward the receiving member 20. As indicated above, the actual lens assembly is more complex than that illustrated herein, although such lens assemblies are well known in the art and, therefore, are only schematically illustrated herein.

FIGS. 2 and 3 illustrate one form of lamp and mirror assembly which is used in score projection systems and, in this case, comprises a bracket 54 of somewhat U-shaped construction and including a base plate 56 and a pair of outwardly and upwardly diverging legs 58. Secured to the interiorly presented flat walls of each of the legs 58 are mirrors 60. These mirrors 60 are located at a proper angle with respect to a light source and with respect to the condensing lens 44 so as to project light in a proper pattern. In this case, the mirrors 60 correspond to the mirrors 42 illustrated in FIG. 1 of the drawings.

Secured to the base plate 56 is a socket 62 corresponding to the socket 36. The socket 62 is provided with an annular base flange 64 and this base flange 64 is secured to the base plate 56 by means of conventional fasteners 66 which extend through aligned apertures 68 and 70 in the base flange 64 and base plate 56, respectively.

A light source, such as an electrically energizable bulb, 72 is threadedly retained in the socket 62 and includes an electrically energizable filament 74. The bulb 72 is also provided with a light opaque cap 76, which is typically a black coating. This light opaque cap 76 is provided in order to prevent direct light emission through the window assembly 43 in the table plate 30. In this way, all light passing through the window assembly 43 results from light reflection from the mirrors 60.

Disposed above the light source 72 is a heat dissipating shield 78 which includes a flat top plate 80 and a pair of downwardly and outwardly angulated side plates 82 extending from the flat top plate 80. Moreover, the flat top plate 80 is provided at each of the opposite ends thereof with flanges 84 having apertures 86 for securement of the shield 78 to the projector in any conventional manner. In this case, the apertures 86 are designed to receive conventional bolt-type fasteners. Moreover, it can be observed by reference to FIGS. 2 and 3 that the heat dissipating shield 78 is located in such manner that it does not block light reflected from the mirrors 60.

FIGS. 4 and 5 of the drawings more fully illustrate the improvement system which is used in the image projection system as illustrated in FIGS. 2 and 3. In this case, the fasteners 66 are removed in order to enable removal of the socket 62 and the light source 72 carried thereby. After removal thereof, a bracket 88, more fully illustrated in FIG. 6 of the drawings, is secured to the base plate 56 of the bracket 54. In this case, the bracket 88 is of generally inverted U-shaped construction and includes a top wall 90 with a pair of depending spaced apart legs 92 and each of which integrally merge into horizontally struck mounting flanges 94. These mounting flanges 94 are each provided with apertures 96 which are alignable with the apertures 70 in the base plate 56 and receive conventional fasteners such as the fasteners 66 in order to secure the bracket 88 to the base wall 56.

Secured to the flat plate 90 by means of sheet metal screws 98, or the like, which extend through apertures 99 in the plate 90, is a mounting plate 100 which carries a light socket 102. Removably mounted in the socket 102 is an improvement light source, in the form of a bulb 106, having a filament 107. By further reference to FIGS. 4 and 5, it can be observed that the bulb 106 includes a metal base section 108 with a ceramic top layer 109. The socket 102 is a bayonet-type socket so that the base section 107 of the bulb 106 can be mounted therein in a bayonet type fashion.

The improvement light source 106, together with a replacement reflector screen, in place of the original screen 20, is capable of generating an image on the replacement screen with the same degree of clarity and brightness as the light source 72. However, in this case, it can be observed that the bulb 106 is of substantially smaller dimension than the bulb 72. Consequently, the bracket 88 is provided in order to locate the bulb 106 in a proper position with respect to the mirrors 60. However, it can be observed that the filament 107 in the improvement bulb 106 is located in the same relative position with respect to the mirror 60, as was the filament 74 in the bulb 72. In addition, it can also be observed that the bulb 106 does not require an opaque cap, such as the opaque cap 76 in the bulb 72.

It has been found in connection with the present invention that the same degree of brightness is generated on the screen 20 with approximately 100 to about 150 watts of power applied to the improvement bulb 106, whereas the bulb 72 required approximately 750 watts of power to operate the same. In any case, it has been determined in accordance with the present invention that with the improvement screen, as hereinafter described, and with the improved light bulb 106, the image can be projected on the improvement screen with the same degree of brightness and by utilizing at least one-half the power normally applied to the original light source. In most cases, it has been found that substantially less than one-half the amount of power, and usually about 20% to about 30% of the amount of power, to the original light source can be used.

Inasmuch as the improvement light bulb 106 does not have an opaque cap, in some cases it has been found desirable to add a light deflector plate 110 and which is secured to the depending side plate 82 of the heat shield 78. In this case, the light deflector plate 110 is preferably formed of an opaque color and is secured to the flat plate 82 by means of a conventional fastener 112. If desired, an additional light deflector plate 110 could be secured to the opposite flat leg 82.

FIG. 7 illustrates a modified form of light source and mirror arrangement in a score projection system and, in this case, a socket 114 is located within a recessed portion or so-called "well" 116 formed in a portion of a structural member 118, usually a sheet metal housing. The socket 114 is similar to the socket 62 and includes an annular base flange 119 which is secured to the base portion of the well 116 by means of conventional fasteners 120 which extend through aligned apertures 121 and 122 in the base flange 119 and structural member 118, respectively. Moreover, the socket 114 is provided with a removable bulb 123, similar to the bulb 72, and which is operable with a pair of parabolic mirrors 124. The mirrors 124 are secured to a suitable structure on a part of the score projector (not shown). By further reference to FIG. 6, it can be observed that the bulb 123 is similarly provided with an opaque cap 125 in the same manner as the bulb 72 was provided with the opaque cap 76.

FIG. 8 illustrates the improvement system utilizable with the image projection system of the present invention, and in this case the bracket 88 is replaced for the socket 114 and secured within the well 116 by means of the conventional fasteners 120. The apertures 96 of the bracket 88 are alignable with the apertures 122 to receive the fasteners 120. Moreover, the bracket 88 is provided with the mounting plate 100 and the socket 102 which also carries the improvement bulb 106. Thus, it can be observed that the bracket 88 can be secured within the well 116 through the same apertures which were used to receive the fastener 120 in order to secure the socket 114 in the well 116. In like manner, it can also be observed that the filament 107 in the bulb 106 is located with respect to the parabolic mirrors 124 in the same manner as the filament in the bulb 123.

FIGS. 9 and 10 illustrate another form of light source which is used in a score projection system and, in this case, the score projection system comprises a light housing 126 formed in an end of a rectangularly shaped metal tube 127. The light housing 126 includes a back wall 128 and a top wall 130. A bottom wall section 132 extends from the back wall 126 parallel to the top wall 130 and is provided with an enlarged light passage aperture 134. A front wall 136 is hingedly connected to the top wall 130 by means of a hinge 137 to thereby provide access to the interior of the housing 126. The top wall 130 is also provided with a heat shield 138 as illustrated in FIG. 9 of the drawings. The metal tube 127 is actually an elongate tube with an individual light housing 126 at each of the opposite ends so that light emitted from each of the light housings can be used through individual mirror systems to display a pair of score sheets or other images. A blower pipe is connected to the metal tube 127 and passes air from a blower (not shown) through the light housing and out of each of the open transverse ends to provide the desired heat dissipation.

Located within the light housing 126 is a retaining plate 142 which is secured to the back wall 128 of the housing 126 by means of conventional fasteners 144 which extend through aligned apertures 146 in the retaining plate 142 and in the back wall 128. The retaining plate 142 is provided at each of its opposite ends with a pair of forwardly projecting electrically conductive bulb retaining clips 144. The clips 144 are located to receive and carry a removable light bulb 146 having a filament 148. In this case, the bulb 146 is provided with electrically conductive extended end caps 150 which are connected to the filament 148 and which end caps 150 are snap-fitted into the opposed and spaced apart clips 144. In this score projection system, two such bulbs 146 are normally employed, each of which operate on 350 watts of power. Therefore, approximately 750 watts of power are required for operating both of the bulbs 146.

A pair of mirrors 152, similar to the previously described mirrors 60, are located beneath the light housing 126 and arranged so that light from this bulb 146 which passes through the light passage aperture 134 is reflected from the mirrors 152, in the manner as previously described. These mirrors 152 are retained in relation to the light housing 126 by any suitable structure (not shown).

This embodiment of the improvement system of the present invention provides a bracket 158 which is replaceable for the bracket 142, and in this case the bracket 158 is located in the housing 126. The bracket 158 comprises a first leg 160, which constitutes a mounting leg, and a perpendicularly disposed second leg 162, which constitutes a socket retaining leg. The mounting leg 160 is secured to the back wall 128 of the housing 126 by means of the fasteners 144. In this case, the leg 162 is provided with apertures 164 alignable with the apertures 148 in order to accommodate the fasteners 146. The leg 162 of the bracket 158 carries a mounting plate 166 by means of fasteners 168 and which mounting plate 166 carries a socket 170. Removably located in the socket 170 is a light bulb 172 having a filament 174 and which is similar to the previously described bulb 106. Again, it could be observed the filament 174 of the bulb 172 would be located approximately in positional relationship to mirrors in the same manner as the filament 148 in the bulb 146 was located.

Again, in connection with the present invention, the one bulb 172, in combination with the improvement screen, provides the degree of clarity and brightness for an image projection as did the previous bulb 146. Moreover, the bulb 172 is capable of operating with 150 watts of power or less which, again, is substantially less than the power consumed by the original bulb 146.

Inasmuch as the improvement light sources in the image projection systems of the present invention do not require the substantial amount of power required by the original light sources, circuit modifications may also be provided in order to reduce the cost of operation of the image projection systems. In this case, a typical image projection system electrical circuit is more fully illustrated in FIG. 12 of the drawings, and comprises a pair of power conductors 176 and 178, along with a ground conductor 180. A conventional fuse 182 may be located in one of the conductors 176. A conventional circuit switch 184 is also located in the line 176 and is connected to the primary coil 186 of a transformer. The light source 154, as illustrated in FIG. 9, is connected from a center tap on the primary coil 186 and connected to the conductor 178. In addition, a blower 188 is also connected through the center tap and connected to the conductor 178, in the manner as illustrated in FIG. 11 of the drawings.

FIG. 13 illustrates possible circuit modifications by utilizing the improvements in the image projection system of the present invention. In this case, the blower 188 is not required in order to dissipate the heat generated by the previously described original light sources. Accordingly, the light source, such as the improved light source 172, is connected across the conductor 178 and a center tap 190 on the primary coil 186 of the transformer. Thus, it can be observed that the improvement light source 172 operates at a different power level. Accordingly, less current is required for operation of the light source 172 and, hence, less power is required therefor.

FIG. 14 illustrates an improvement reproducing member, or so-called "screen", 192 which may be substituted for the original screen 20. This improvement screen is a laminated structure which is comprised of a ply or layer 194 of a cloth material, such as a biaxially oriented nylon material having a thickness of about 0.0006 inches. This form of nylon material is obtainable from Marubeni-Lida American, Inc., of New York, N.Y., under the trade designation "Emblem". The ply 194 is adhesively attached to a ply or layer of aluminum foil 196 of approximately 0.00035 inches in thickness, through a ply or layer 198 of polyethylene. The polythylene layer 198, which is biaxially oriented, serves as a bonding layer between the two plys 194 and 196. In this case, the dull side of the aluminum foil 196 is projected toward the nylon layer 194 and the polished or bright surface thereof is projected in the opposite direction. The bright surface of the aluminum foil layer 198 is adhesively secured to an additional ply or layer 200 of polyethylene, which constitutes a relatively thick ply, and this ply 200 comprises usually about 50% of the overall thickness of the entire laminated structure as thus described. The polyethylene ply 198 usually advantageously contributes less than about 20% of the overall thickness of the laminated structure as thus described.

The laminated structure, and more particularly the relatively thick polyethylene layer of the ply 200, may be secured to a wooden backing 202 by means of any suitable adhesive. Preferably, the wooden backing 202 is comprised of a dry-fiber pressboard material generally about ⅛ inch in thickness. This form of pressboard contains essentially no oil content therein and may be obtained under the commercial designation U.L. 50 from U.S. Plywood Corporation. If desired, a tape 204 may be disposed around the entire periphery of the laminated structure and backing member as described. This tape 204 aids in attaching the members and prevents delamination and also aids in further sealing against entry of moisture or other deleterious foreign substances.

One of the advantages of the pressboard type material, as opposed to other forms of fiber-containing wooden backings, is that this pressboard material contains essentially no oil content. Other forms of wooden backings which do contain oil have been found to result in delamination and formation of bubbles and the like which interfere not only with the operation of the reflecting member, but the overall life thereof.

The laminated structure, including at least the initially four described plys, is described in U.S. Pat. No. 3,836,425, although in this case the laminated structure was used as a thin flexible barrier material meeting several military specifications. Nevertheless, it has been found in connection with the present invention that this material is highly functional as a screen. In addition, it has also been observed that the dull side of the aluminum foil ply 196 is presented forwardly and this structure, in combination with the other layers, provides the reflective surface which presents an image which has a high degree of optical clarity and brightness.

The biaxially oriented polyethylene layer 198 is employed to serve as the adhesive bonding layer for bonding the aluminum foil ply 196 to the nylon ply 194 as previously described. Other forms of polyolefins could be substituted for the bonding layer 198 and also for the relatively thick ply 200 of polyethylene. Moreover, the polyethylene ply 200 is usually low density polyethylene and is particularly notable for good low-temperature physical characteristics and its ability to provide a relatively thick, but yet flexible, protective layer to minimize the effects of other defects in the materials.

In the laminating process, the various layers are passed through rollers where certain stresses are generated between the polyethylene 198 and the aluminum foil ply 196 and which occurs during the elongating process in rolling thereof. The resultant reproducing member has been found to provide high reflectivity with a relatively small amount of side dispersion in the lateral plane. In this case, dispersion in the longitudinal plane exists within the range of 15° to 20°.

Other forms of metal foil may be used in place of aluminum, although the aluminum is preferred. One form of aluminum foil which may be used, and which is the preferred foil, is the class 2, military specification material MIL-B-131-D, offered by Rap Industries, Inc. Another form of metal foil which may be used is the class 2, military specification MIL-B-131-E, offered under the trademark Marvelseal 1313 by Ludlow Corporation and under the trademark Foilpak No. 6 by Champion Packages Co. One other form of foil which may be used is that metal foil offered under the military specification MIL-B-131-F, class 1, offered under the trademark Marvelseal 360 and as described in the aforesaid U.S. patent.

FIG. 15 illustrates another improvement screen 206 constructed in accordance with and embodying the present invention. However, in the case of the improvement screen 206, a layer of a paperboard material 208 is located on the surface of the polyethylene layer 200 facing the backing 202 for purposes of sealing to the backing 202. The sealing is accomplished by means of an adhesive such as an epoxy adhesive. It has been found in connection with the present invention that the paperboard material is quite effective for purposes of securement. Moreover, the nylon cloth mesh material is not employed in the embodiment of FIG. 15. In each case, it can be observed that the layer 198 must be of such thickness so as to permit transmission of light. In this case, the layers 194 and 208 should have a thickness of about 0.0006 inches, although the thickness may range from about 0.0010 inches to about 0.0002 inches in thickness.

The screen 206 may also employ an adhesive bonding layer 210 for bonding the polyethylene layer 198 to the metal foil 196. It should also be observed that this adhesive bonding layer 210 could be used in the screen 192, if desired. Generally, any conventional form of adhesive may be used in the layer 198 as well as in securing the layer 208 to the backing 202, although epoxies and the like are preferred. Here, again, the thickness of the layer 210 should be sufficiently thin so that it does not impede light transmission characteristics.

In the screen 192, it can be observed that this screen employs a relatively thick layer of polyethylene, such as the layer 200 and the layer 198 which is of substantially lesser thickness. However, in the case of the screen 206, the layer 200 was of substantially reduced thickness. In this case, the layer 200 has a thickness at least equal to or greater than the thickness of the layer 198. A metal foil, such as the foil 196, is encapsulated between these two layers, even though the adhesive bonding layer 210 is employed. In each case, the screen material may, although not necessarily, be secured to a backing such as the wood backing 202. Also, a border area, such as the rim 204, may be employed.

FIG. 16 illustrates another modified form of screen 212 which may also be used in accordance with the present invention. The screen 212 is similar to the screen 206 except that this screen employs a polyethylene layer 214 which is similar to the polyethylene layer 198, but which has a relatively thin construction and considerably less than that of the polyethylene layer 200. In addition, this screen is also provided with the nylon layer 194. While this embodiment of the screen is not as preferred as the embodiments illustrated in FIGS. 14 and 15, it can nevertheless be used in accordance with the present invention.

FIG. 17 illustrates another improvement screen 220 constructed in accordance with and embodying the present invention and which is similar to the improvement screen 206 in FIG. 15. However, in the case of the improvement screen 220, a layer of a paperboard material 208 is located on the surface of the polyethylene layer 200 facing the backing 202 for purposes of sealing to the backing 202. The sealing is accomplished by means of an adhesive such as an epoxy adhesive. Moreover, a nylon cloth mesh material 222 is employed and is similar to the nylon layer 194. In each case, it can be observed that the nylon layer 194 as well as the layer 208 must be of such thickness so as to permit transmission of light. In this case, the layers 194 and 208 should have a thickness of about 0.0006 inches, although the thickness may range from about 0.0010 inches to about 0.0002 inches in thickness.

Materials somewhat similar to those used in the screens of the present invention were previously used as barrier materials as taught in U.S. Pat. No. 3,836,425, as identified above. However, it has now been found that it is possible to use somewhat similar materials as improved image displaying screens. Previously, it was heretofore unsuggested or unknown that these barrier materials would actually, when modified, serve as highly effective image displaying screens.

The layer of nylon material 194, as well as the layer 222, is preferably a biaxially-oriented polymer film where the polymer may be an impact-resistant polymeric material such as nylon, poly(ethylene-terephthalate) and polypropylene. The relatively thick layer of polyethylene 200 is preferably a low-density polyethylene with good low-temperature physical characteristics. However, it should be observed that polyvinylchloride or similar thick organic thermoplastic material can conveniently serve as the layer 200.

In each of the aforesaid embodiments, the nylon layer 194 and the paperboard layer 208 are preferably about 0.0006 inches in thickness, although thickness may range from about 0.0014 inches to about 0.0001 inches in thickness. The aluminum foil preferably has a thickness of about 0.00035 inches although the thickness of the metal foil may range from 0.00092 inches to about 0.00011 inches.

These improvement screens have been found to be highly suitable for use as reflective or image displaying screens, inasmuch as they do not have nearly the amount of weight as the conventional screens. Accordingly, the screens of the present invention can be secured to the head strip 22 in a much quicker and easier fashion using conventional nails or the like. Moreover, the improved screens do not have the same delamination problems as the conventional screens and, in addition, are virtually free from bubble effects. These improved screens were tested on a standard magnesium light reflecting comparator and were found to be 250 to 300% better than the standard magnesium base.

The improved screens were found to have at least the same reflective capabilities as the highly expensive beaded and lectilinear screens which were previously employed in the prior art. However, these improvement screens not only provide the same clarity and brightness as the prior art screens, but provide such clarity and brightness with a light source operating on a very substantially reduced power, as previously described. Equally importantly, the improved screens of the present invention can be produced at a cost substantially less than the costs of the beaded screens and lectilinear screens employed in the prior art. In addition to the above, the improved screens of the present invention have been found to be quite tough and durable and, also importantly, these screens are washable without destroying the screen or otherwise interfering with its operability, which was not the case with the other forms of prior art screens. Moreover, the screens of the present invention are not delicate as was the case of the prior art screens, and therefore are capable of being maintained without the necessary degree of care as was required with the previous prior art screens.

In accordance with the present invention, it can be observed that by utilizing the improved screens of the present invention, and by utilizing the improved light sources, very substantial cost savings can result due to the lower power consumption required with the improved system of the present invention. When considering the substantial cost of power for operating such systems, the system of the present invention has been found to be highly effective in providing the reflectiveness of a projected image with the same degree of brightness and clarity without the expensive light sources and the attendant cooling systems and the expensive screens which were employed in other prior art systems.

Thus, there has been illustrated and described unique and novel improvement image displaying screens for use in image projecting systems and which enable an image projecting system to be operated at a substantially lower unit cost and which therefore fulfills all of the objects and advantages sought therefor. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention which is limited only by the following claims.

Having thus described our invention, what we desire to claim and secure by letters patent is:

1. An image displaying screen of the type used with a conventional image projection system for projecting an image to the screen, said image displaying screen comprising a first layer of a relatively thick organic polymer material, a second layer of a metal foil having a dull surface and an oppositely disposed glossy surface and providing image displaying characteristics, said second layer being incidental to and secured to said first layer such that the glossy surface is incidental to the first layer, a third layer of polymer material incidental to and being secured to the dull surface of said second layer, and a fourth layer incidental to and secured to said third layer and having a thickness so that it is transmissive of light, said fourth layer and the dull surface of said second layer being disposed toward the source of the projected image.

2. The image displaying screen of claim 1 further characterized in that said third layer has a thickness equal to or less than said first layer.

3. The image displaying screen of claim 1 further characterized in that a polymeric adhesive layer bonds said second layer to said third layer.

4. The image displaying screen of claim 1 further characterized in that said third layer is a biaxially oriented polymer film.

5. The image displaying screen of claim 4 further characterized in that said first layer is formed of a polyolefin.

6. The image displaying screen of claim 5 further characterized in that said fourth layer is a member selected from the class consisting of a cloth material and a paper material.

7. The image displaying screen of claim 1 further characterized in that said screen comprises a retaining member incidental to said first layer and being formed of a pressboard-type material which contains substantially no entrained oil therein.

8. An improvement for use in a generally conventional image projection screen of the type which projects an image from a substrate associated with a projector to an image displaying screen, and which projector typically comprises a mirror and a socket with a light source, said improvement comprising:

(a) an improvement light source relative to said projection system for insertion into a light socket and having a filament means therein which is located in relation to a mirror forming part of said system in a manner similar to the relation of a filament means in the original light source of said system, said improvement light source having a size so that the filament means in said improvement light source is located in substantially the same optical relationship as the filament in the original light source, and (b) an improvement image displaying screen relative to said projection system replaceable for the original image displaying screen forming part of said projection system, said improvement image displaying screen comprising a first layer of a relatively thick organic polymer material, a second layer of a metal foil having a dull surface and an oppositely disposed glossy surface and providing image displaying characteristics , said second layer being incidental to and secured to said first layer, a third layer of an organic polymer material incidental to and being secured to said second layer such that the glossy surface is incidental to the first layer, and a fourth layer incidental to and secured to the dull surface of said third layer and having a thickness so that it is transmissive of light, said fourth layer and the dull surface of said second layer being disposed toward the source of the projected image, said improvement screen having image displaying characteristics in combination with said improvement light source to improve image reproduction with substantially reduced power requirements.

9. The improvement for use in the image projection system of claim 8 further characterized in that said improvement comprises:

(a) an improved bracket relative to said projection system and having a plate forming a part thereof,
(b) mounting means on said bracket for mounting said bracket to a projector forming part of said projection system in the region where a socket forming part of said system was located,
(c) an improvement light socket relative to said projection system of said plate, and said improvement light source is inserted in said improvement light socket.

10. The improvement of claim 9 further characterized in that said third layer has a thickness equal to or less than said first layer.

11. The improvement of claim 9 further characterized in that said third layer is a biaxially oriented polymer film and that said first layer is formed on a polyolefin, and that said fourth layer is a member selected from the class consisting of a cloth material and a paper material.

12. An image displaying screen of the type used with a conventional image projection system for projecting an image of the screen, said image displaying screen comprising a first layer of a paper material, a second layer of a relatively thick organic polymer material, said second layer being incidental to and secured to said first layer, a third layer of a metal foil having a dull surface and an oppositely disposed glossy surface and providing image displaying characteristics, said third layer being incidental to and secured to said second layer such that the glossy surface is incidental to the second layer, a fourth layer of an organic polymer material incidental to and being secured to the dull surface of said third layer, and having a thickness so that it is transmissive of light, said fourth layer and the dull surface of said third layer being disposed toward the source of the projected image.

13. The image displaying screen of claim 12 further characterized in that said screen comprises a retaining member incidental to said first layer and being formed of a pressboard-type material which contains substantially no entrained oil therein.

* * * * *